(12) United States Patent
Jorna (10) Patent No.: US 7,883,288 B2
(45) Date of Patent: Feb. 8, 2011

(54) CONNECTOR

(75) Inventor: Joannes Hendricus Maria Jorna, Eagle Farm (AU)

(73) Assignee: Minnis & Samson Pty, Ltd., Eagle Farm, Queensland (AU)

( * ) Notice: Subject to any disclaimer, the term of this patent is extended or adjusted under 35 U.S.C. 154(b) by 442 days.

(21) Appl. No.: 11/864,064

(22) Filed: Sep. 28, 2007

(65) Prior Publication Data

US 2009/0087255 A1 Apr. 2, 2009

(51) Int. Cl.
*E04B 1/19* (2006.01)

(52) U.S. Cl. .................. 403/171; 403/175; 403/280

(58) Field of Classification Search ............ 403/172, 403/174, 175, 178, 280, 282; 211/182
See application file for complete search history.

(56) References Cited

U.S. PATENT DOCUMENTS

| | | | | |
|---|---|---|---|---|
| 1,552,104 A * | 9/1925 | Zahner | | 248/188.5 |
| 1,817,775 A * | 8/1931 | Sipe | | 403/361 |
| 2,936,530 A * | 5/1960 | Bowen | | 434/72 |
| 2,996,159 A * | 8/1961 | Casebolt | | 403/280 |
| 3,325,585 A * | 6/1967 | Brenneman | | 52/288.1 |
| 3,462,021 A * | 8/1969 | Hawke et al. | | 211/182 |
| 3,532,369 A * | 10/1970 | Reilly | | 403/176 |
| 3,726,551 A * | 4/1973 | Levenberg | | 403/172 |
| 3,731,958 A * | 5/1973 | Offenbroich | | 403/280 |
| 3,804,542 A * | 4/1974 | Hammerschmidt | | 403/264 |
| 3,851,601 A * | 12/1974 | Davis | | 108/158.11 |
| 3,851,980 A * | 12/1974 | Worth et al. | | 403/172 |
| 3,977,800 A * | 8/1976 | Cassel | | 403/172 |
| 4,111,577 A * | 9/1978 | Kiyosawa | | 403/172 |
| 4,161,375 A * | 7/1979 | Murphy | | 403/169 |
| 4,270,872 A * | 6/1981 | Kiyosawa | | 403/170 |
| 4,516,376 A * | 5/1985 | King | | 52/655.1 |
| 4,630,550 A * | 12/1986 | Weitzman | | 108/155 |
| 4,770,560 A * | 9/1988 | Ott | | 403/296 |
| 4,792,256 A * | 12/1988 | Batchelor | | 403/296 |
| 4,815,727 A * | 3/1989 | Kiribuchi | | 482/43 |
| 5,177,920 A * | 1/1993 | Rafeld | | 52/314 |
| 5,307,708 A * | 5/1994 | Matt | | 74/567 |
| 5,642,957 A | 7/1997 | Lange | | |
| 5,711,230 A * | 1/1998 | Parsons | | 108/186 |
| 5,893,675 A | 4/1999 | Lange | | |
| 6,062,761 A * | 5/2000 | Allen | | 403/170 |
| D427,895 S * | 7/2000 | Morton | | D8/382 |
| 6,082,070 A * | 7/2000 | Jen | | 52/650.3 |
| 6,257,767 B1 | 7/2001 | Borcherding et al. | | |
| 6,332,657 B1 * | 12/2001 | Fischer | | 312/111 |
| 6,588,334 B2 * | 7/2003 | Salisbury | | 101/127.1 |
| 6,935,623 B2 * | 8/2005 | Cook et al. | | 256/65.08 |
| 7,595,565 B2 * | 9/2009 | Chen et al. | | 290/55 |

FOREIGN PATENT DOCUMENTS

GB 2020390 11/1979

* cited by examiner

*Primary Examiner*—Joshua T Kennedy
(74) *Attorney, Agent, or Firm*—Lando & Anastasi, LLP (57) ABSTRACT

A connector (11) for connection to a hollow frame member (12) the connector having at least one projection (17) for receiving a complimentary end of the hollow frame member, the projection having raised portions (19) on an outer surface thereof and the projection is dimensioned relative to the hollow frame member such that force is required to fit the hollow end over the projection and during fitting the hollow end of the frame member is deformed about the projection so as to be internally engaged by the raised portions.

15 Claims, 7 Drawing Sheets

CONNECTOR

FIELD OF THE INVENTION

The present invention relates to a connector for connecting structural frame members, at least one of which frame member is hollow. The present invention is particularly directed towards connectors for use in connecting frame members of furniture. The present invention also relates to a frame assembly incorporating the connector of the invention.

BACKGROUND OF THE INVENTION

The present invention will be described with particular reference to a frame and framing system for furniture. However, it will be appreciated that the present invention may have other applications and no limitation is intended thereby.

SUMMARY OF THE INVENTION

According to a first broad form of the present invention, there is provided in combination, a connector and a hollow frame member having a deformable end, the connector having at least one projection having raised portions on an outer surface thereof, wherein the projection is dimensioned relative to the deformable end of the hollow frame member such that during fitting of the end over the projection the hollow end of the frame member is deformed about the projection and is internally engaged by the raised portions.

The connector of the present invention can connect the ends of one or more hollow frame members to each other. Examples of such applications may be essentially two dimensional structures such as door frames, window frames, barriers, advertising sign frames or the like.

The connector may also connect one or more hollow frame members to a support member.

In this case, the connector typically includes a collar or sleeve for receiving the support member. The collar or sleeve has a cross section complimentary to the outer surface of the frame member. The collar is typically dimensioned to allow it to be press fitted over the support member. Typically, the internal face of the collar has raised portions that grip or engage the support member when it is press fitted into the collar.

The connector may also be used to connect a hollow frame member to a flat surface such as a wall or floor. In this case, the connector may have a base upon which the projection extends. The base may be fixed to the wall or other surface by suitable means such as bolts, screws or the like.

The connector has at least one projection that is forcibly received by the deformable end of a hollow frame member. The projection has a number of raised portions on the outer surface thereof which in use internally engages the end of the hollow frame member. The raised portions may be in any suitable form and may be in the form of multiple teeth, knobs or the like. Preferably, the raised portions are in the form of parallel ribs that run in a directional an angle to the direction in which the end of the frame member is fitted onto the projection. Preferably the ribs have a triangular cross section.

The projection is typically of rectangular or square cross section in which case the projection has opposing side walls. Typically the raised projections are located on each side wall.

The end of the hollow frame member is deformable such that it deformed about the projection during fitment. As discussed above, the relative dimensions of the projection and the projection are such that force is required to fit the end of the hollow frame member over the projection. This deformation results in a very tight fit about the projection and the raised portions "bite" into the inner surface of the hollow frame member. Generally, no further fixing of the connector to the frame member is required.

According to a further broad form of the invention, there is provided a frame assembly having hollow frame members connected by a connector of the invention.

The connector of the present invention is preferably formed from extruded aluminium. However, it will be appreciated that the connector may be formed from any suitable material in any suitable manner.

The connector and combination of the present invention may find particular application in the construction of metal furniture frames. The use of metal frames for furniture, shelving, trolleys, generator frames, cabinets and the like is well known. Stainless steel is a popular material in view of its aesthetic qualities. Stainless steel frame members are typically welded together. To avoid an unsightly appearance at the weld sites, the welds must be buffed and polished. The entire joining process is expensive in terms of labour and transport costs.

Aluminium frames are also known. Aluminium frame members may be joined by a number of techniques including welding, screwing, providing external connecting brackets or any combination thereof. Typical connecting brackets are right angle connectors that are fastened by rivets or threaded screws. It will be appreciated that ensuring the correct location and alignment of such connectors requires a certain degree of skill. Failure to properly align frame members can result in a failed product that must be discarded.

Other systems rely upon custom designed extrusions that provide interlocking projections and/or recesses. It will be appreciated that providing such custom extrusions may increase material and hence production costs.

It may be appreciated that the present invention may provide an alternative method for joining frame members.

DETAILED DESCRIPTION OF THE FIGURES

Figure 1:
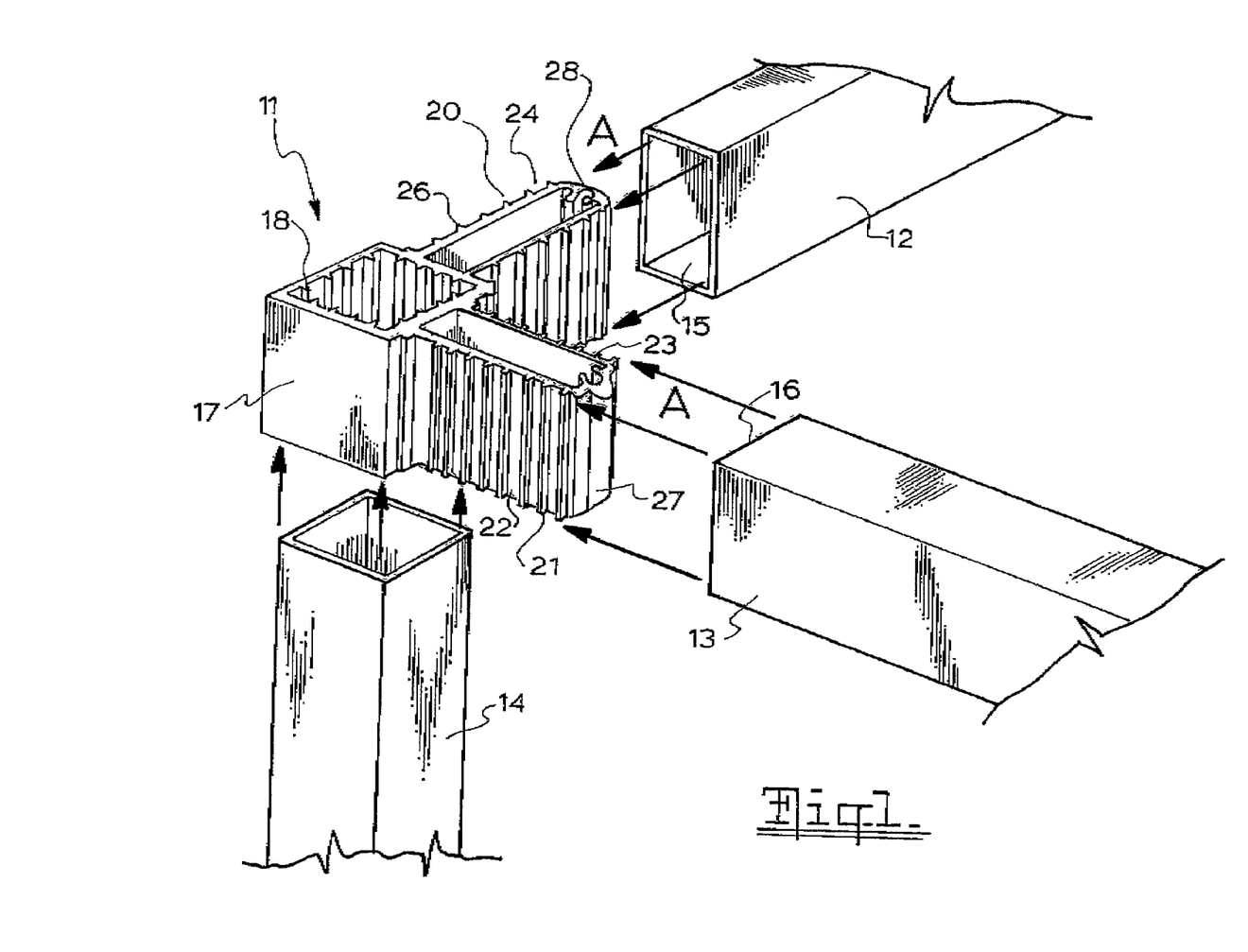
FIG. 1 illustrates an exploded view of a preferred connector of the present invention in use.

FIG. 1 shows an exploded view of a preferred connector 11 of the present invention connecting two hollow frame members 12, 13 to a leg 14 for a piece of furniture. The frame members 12, 13 have a rectangular cross section and are hollow with open ends 15, 16.

The connector 11 is formed from an aluminium extrusion that has been cut to size.

The connector 11 has a collar 17 of square cross section. The internal walls of the collar 17 have a series of inwardly facing and spaced ribs 18. In use, the ribs 18 grip the outer walls of leg 14.

The connector 11 has two projections 20, 21 that extend at right angles to each other. The projections 20, 21 are rectangular in cross section and have opposed side walls 22, 23; 24, 25 each wall having a series of outer facing parallel spaced ribs 26 of triangular shaped cross section. The triangular cross section is that of an equatorial triangle. The spacing between the ribs is at least that of the base width of one rib, preferably a spacing of 2 to 3 ribs. The projections 20, 21 are hollow and are closed by an end wall 27, 28.

In use, the ends 15, 16 of frame members 12, 13 are forced over the ends of projections 20, 21 in the direction of arrows A. The length of the side wails 22, 23; 24, 25 of each projection 20, 21 in the direction perpendicular to the direction in which a respective open end 15,16 is forced over a respective projection 20,21 is longer than that of the corresponding side walls of the frame members 12,13. This means that when the frame members 12, 13 are forced over the projections 20, 21 the end of the frame member deforms or stretches slightly such that the side walls of the frame member are brought closer together so as to firmly press fit against the side walls 22, 23; 24, 25 of each projection. The ribs 26 "bite" into the inner walls of the frame member, thereby forming a positive engagement. This positive engagement is facilitated by the inherent elasticity of the aluminium frame member.

The side walls 22, 23; 24, 25 of the projections are resistant to deformation or lateral movement. This facilitates a firm engagement between the projection and the hollow end of the frame member. It may be appreciated that because the side walls are deformation resistant that they remain substantially parallel in use. This means that each of the ribs have the similar degree of engagement with the inner wall of the frame member. The end walls 27, 28 may assist in resisting inward deformation of the side walls 22, 23; 24, 25 during fitting.

The upper and lower edges of the end walls 27, 28 of the projections are beveled to assist in fitting the ends 15, 16 of the hollow frame member over the projections 20, 21.

Figure 2:
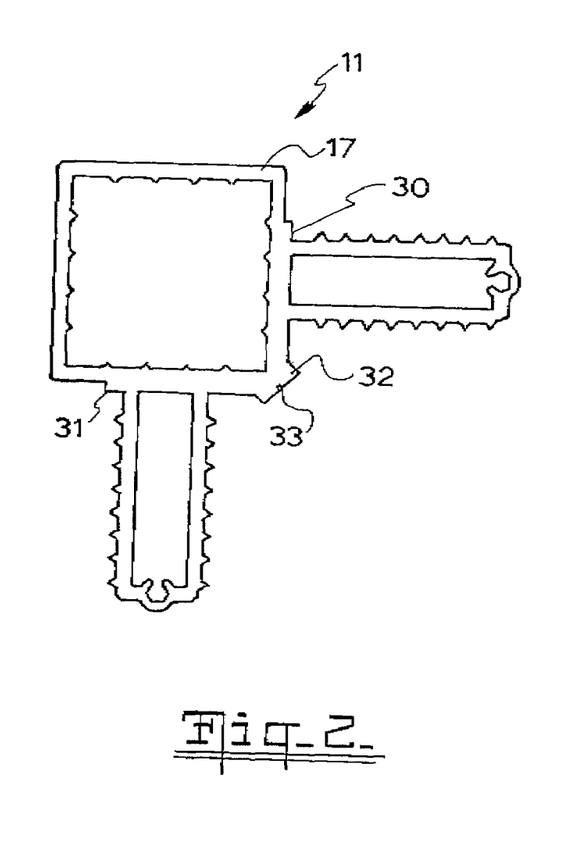
FIG. 2 is a cross section of the connector shown in FIG. 1.

FIG. 2 shows a cross section of connector 11. The connector 11 has two shoulders 30, 31. In use, the shoulders 30, 31 meet the ends 15, 16 of the frame members 12, 13 so as to provide a flush surface and a smooth appearance. Provision of similar shoulders on the other side of the respective projection is not necessary as this part of the connector is not normally visible.

Figure 5:
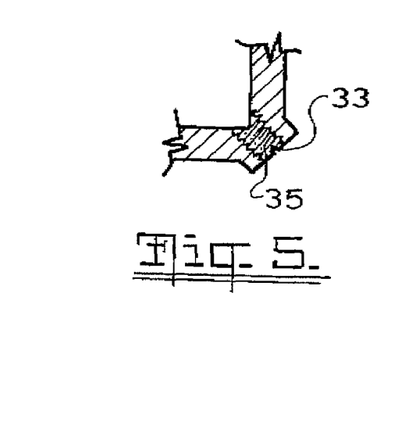
FIG. 5 is a further detail of the connector of FIG. 2.
Figure 6:
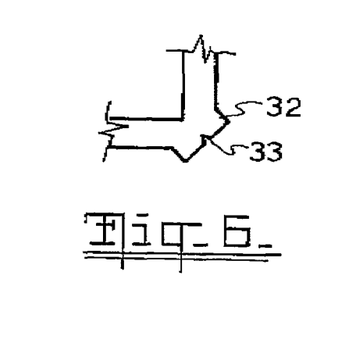
FIG. 6 is a further detail of the connector of FIG. 2.
Figure 7:
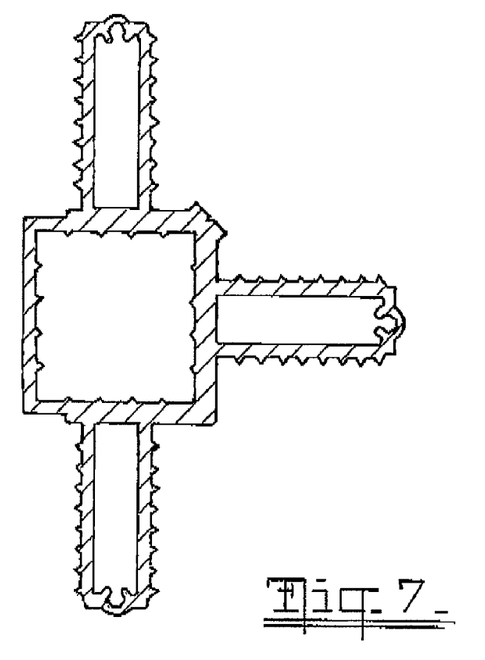
FIGS. 7 to 11 show further preferred connectors of the present invention.
Figure 8:
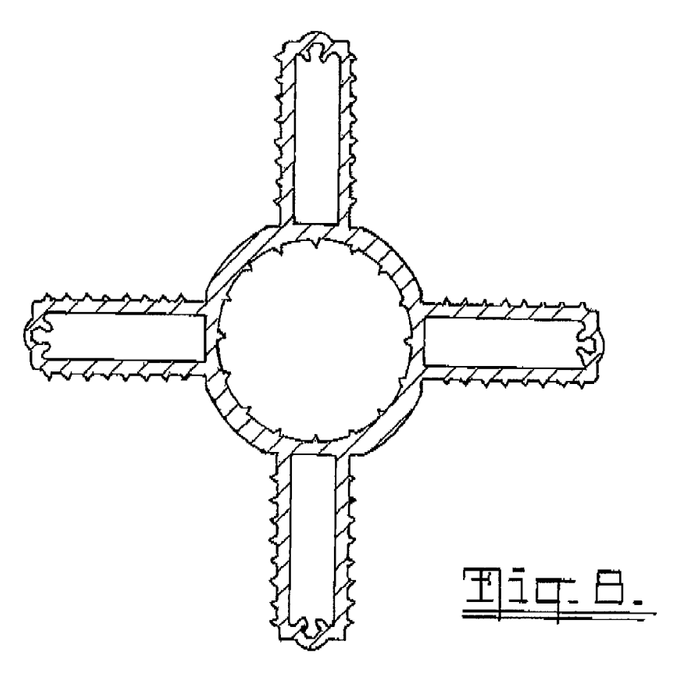
Figure 9:
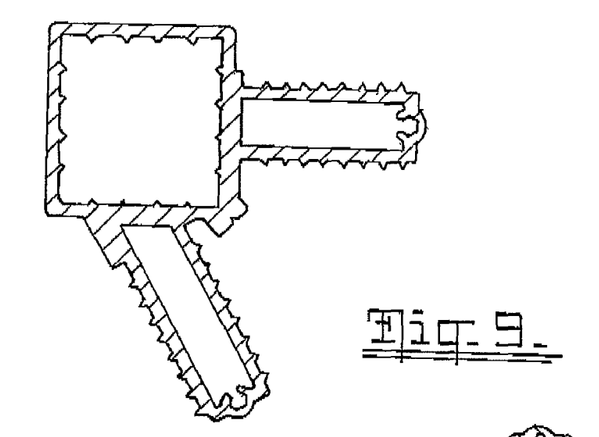
Figures 10, 11:
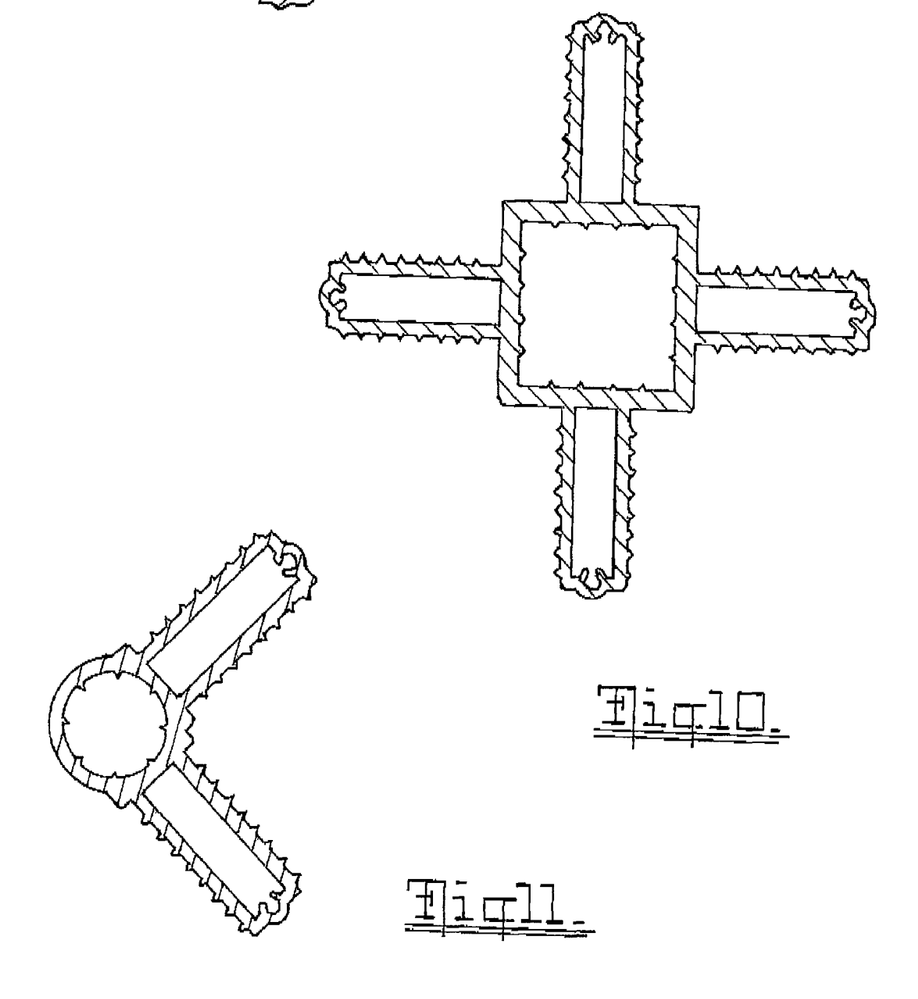
Figure 12:
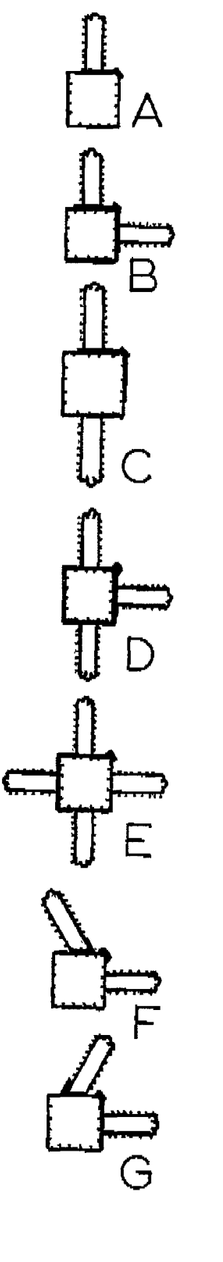
FIGS. 12a to 12d show various furniture frames that may be constructed using preferred connectors of the present invention.
Figures 12A, 12B:
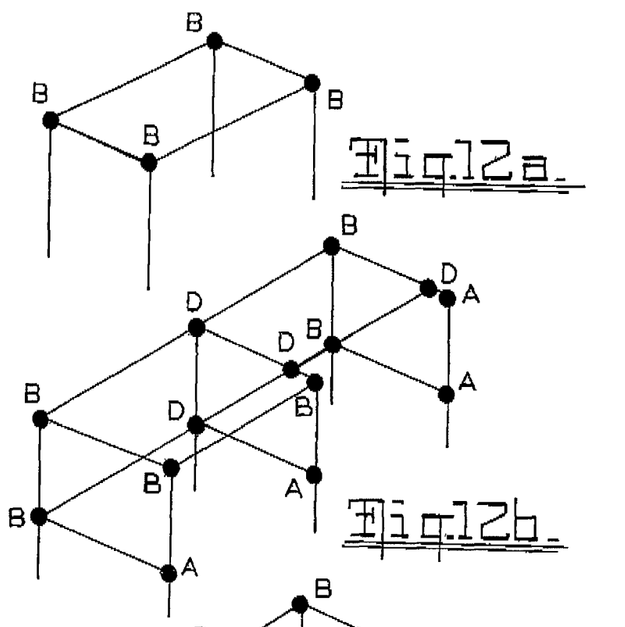
Figures 12C, 12D:
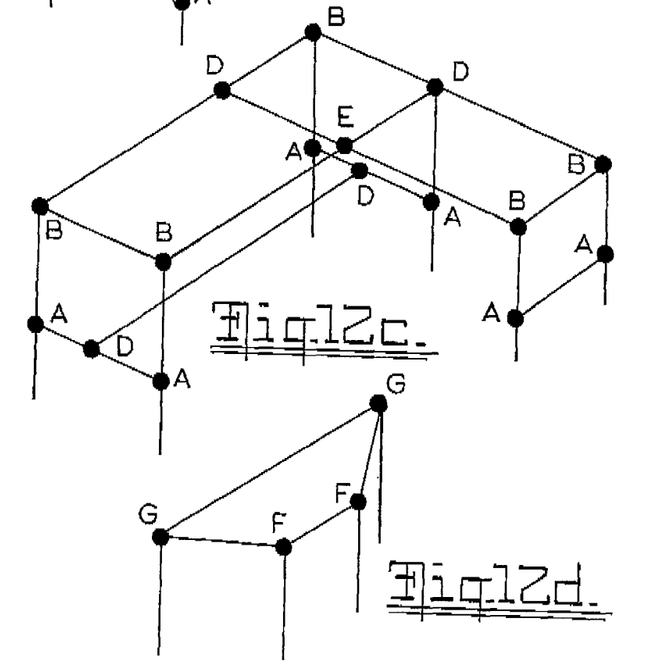

The connector 11 has a raised flat section 32 extending from collar 17. This section has a small "v" 33 extruded therein. The section is sized to a thickness such that in use it may receive a screw, bolt or the like and effectively function as a nut. The "v" acts as a drill locator. A detail is shown in FIG. 6. FIG. 5 shows a cross section of FIG. 6 after a hole 35 has been drilled through nut 32. In use, the nut is used to fix the collar into position on a leg. This may be of particular importance when the leg is formed from timber which may shrink over time. One or more screws are fitted in the nut allowing the collar to be tightened about the leg via the screws from time to time. Additional fixation may be desirable when the collar is a loose fit about a leg of a piece of furniture The nut may also be used to permanently fix the collar into position on the leg. After press fitting the collar into position on the leg, a hole is drilled though the nut and into the leg. The collar may then be pop riveted onto the leg.

Figure 3:
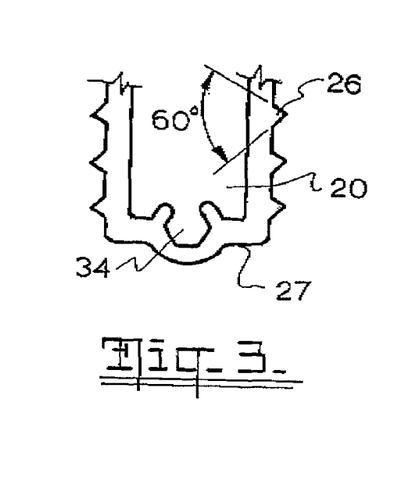
FIG. 3 is a detail of the connector of FIG. 2.

FIG. 3 shows a detail of the end of a projection 20. The end wall 27 has a C shaped cross section 34. This section provides an optional and additional means of securing a hollow frame member to the connector. The C section is dimensioned to receive a self drilling and tapping screw that is inserted after the frame member has been press fitted over the projection. This causes the C section to be forced open slightly proving a firmer grip into the frame member. The screw itself provides an additional locking mechanism.

Figure 4:
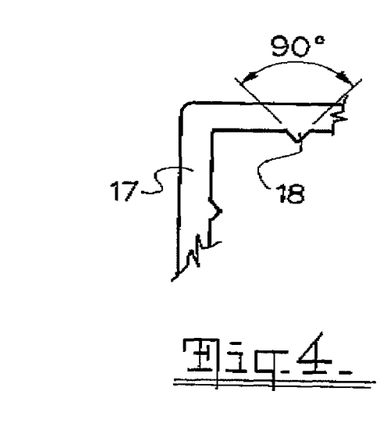
FIG. 4 is a further detail of the connector of FIG. 2.

FIG. 4 shows a detail of the collar 14 and associated inwardly facing ribs 18.

FIGS. 7 to 10 show further preferred connectors of the present invention. These figures show that the collar 14 may be of any desirable cross section and the connector may have any desirable number of projections.

FIG. 12 illustrates the versatility of the types of frames that may be constructed using connectors of the invention.

Figure 13:
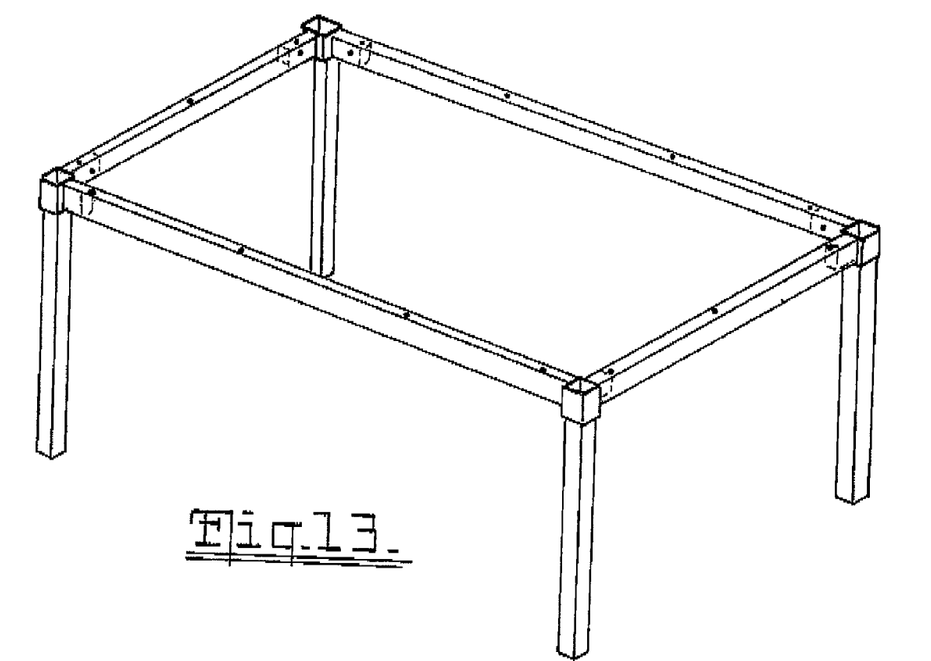
FIG. 13 shows another furniture frame incorporating a preferred connector of the present invention.
Figure 14:
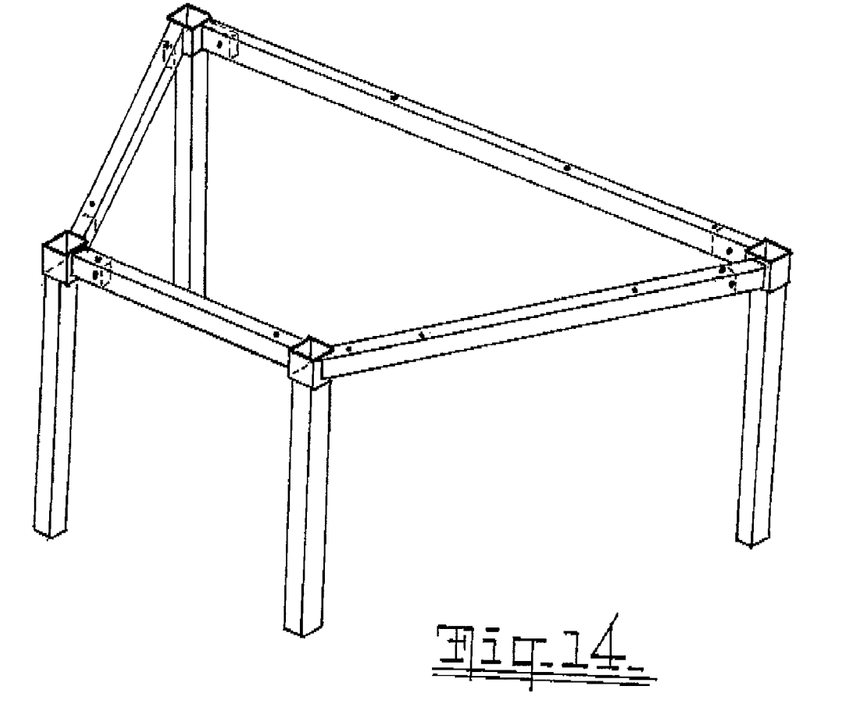
FIG. 14 shows another furniture frame incorporating a preferred connector of the present invention.
Figure 15:
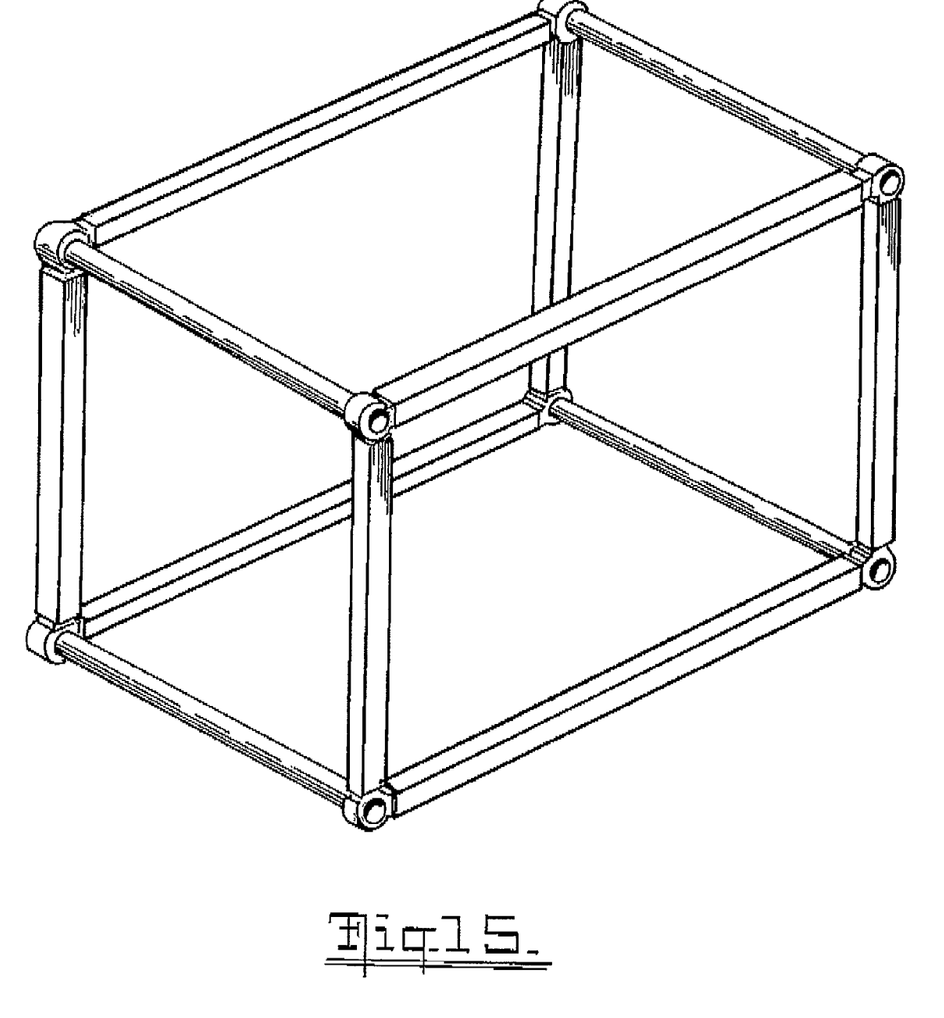
FIG. 15 shows a generator frame incorporating a preferred connector of the present invention.

FIGS. 13 to 15 show further frames that may be constructed using preferred connectors of the present invention.

It may be appreciated that the connector of the present invention allows different frame to be designed and constructed with ease and versatility. For example, if a four legged rectangular square frame is desired having 40×40 mm legs and 50 mm H×25 mm frame members, a connector having a square collar and two projections at 90° would be selected.

The next step would be to cut an extruded 40×40 mm aluminum hollow tube to the desired height for the table leg. The legs are then press fitted into the collars of the connectors. Next a 50 mm×25 mm×2.5 mm aluminum hollow tube is cut to the desired table width, taking into account that the connector will add to the overall frame size. The frame members are then press fitted onto the connectors. Typically, for non-square frames the shorter frame members are connected first.

The table top may then be fitted to the table frame. Holes may be drilled through the underside of the frame members at desirable locations. The holes are then drilled on the underside to a suitable size that will allow the head of a screw and screw driver head to pass therethrough, typically 11.5 mm. The screw hole on the upper side is drilled to about 6.5 mm. A screw is then used to secure the table top to the frame member. For ease of manufacture, the frame members may be pre-drilled.

The final finish of the frame may be determined by selecting a desired finish on the aluminum frame members. For example, the frame members may be pre-anodized or pre-powder coated in the desired colours in full lengths before cutting to the required lengths.

It may be appreciated that the combinations and connectors of the present invention allow frame assemblies to be constructed simply and easily without the requirements for welding. The entire frame may be made from aluminum which is considerably lighter than steel.

It will be appreciated that various changes and modifications may be made to the present invention as described and claimed herein without departing from the spirit and scope thereof.

The invention claimed is:

1. A connector assembly, comprising: a hollow frame member having a deformable open end,
   a projection dimensioned such that force is applied to fit the deformable open end over the projection;
   an outer surface of the first side wall of the projection having a first plurality of ribs an elongated projection having a first side wall and a second side wall resistant to deformation connected by an end wall configured to resist lateral movement of the first wall and the second wall;
   an outer surface of the second side wall of the projection having a second plurality of ribs the outer surface of the first side wall and the outer surface of the second side wall each having an orthogonal length perpendicular to a longitudinal length of the projection, the orthogonal length being greater than a length of a first internal surface and a second internal surface of the hollow frame member such that when force is applied to fit the deformable open end over the projection in a direction along a longitudinal axis of the elongated projection, the first and second internal surfaces of the hollow frame member stretch to the orthogonal length of the projection and the first and the second plurality of ribs positively engage the first and second internal surfaces of the hollow frame member, respectively.

2. The connector assembly of claim 1, wherein the connector has at least two projections.

3. The connector assembly of claim 1, wherein the first and second plurality of ribs each include parallel ribs aligned in a direction substantially at right angles to the direction in which the hollow frame member is fitted onto the projection.

4. The connector assembly of claim 3, wherein the first and second plurality of ribs are of triangular cross section and spaced apart.

5. The connector of claim 1, wherein the projection has a rectangular cross section.

6. The connector assembly of claim 5, wherein the projection is hollow and has the end closed by an end wall.

7. The connector assembly of claim 6, wherein the end wall includes beveled upper and lower edges.

8. The connector assembly of claim 1, comprising:
a collar having a first opening at a first end and a second opening at a second end, the first opening and the second opening each defined by a same distance between a first inner surface of the collar and a second inner surface of the collar;
at least one of the first inner surface and the second inner surface including at least one projection extending into the first opening and the second opening;
wherein the collar is configured to receive at least one support member at the first opening and at the second opening; and
wherein the projection extends from an outer surface of the collar.

9. The connector assembly of claim 8, wherein the collar includes a plurality of raised portions on at least one of the first inner surface and the second inner surface configured to grip an outer surface of the at least one support member.

10. The connector assembly of claim 8, wherein the collar includes a thickened section through which a screw may pass for securing the collar to the support member.

11. The connector assembly of claim 8 wherein the connector is formed from an extruded aluminum section.

12. The connector assembly of claim 8, wherein the projection is hollow and includes an end closed by an end wall.

13. The connector assembly of claim 12, wherein the end wall has an internally facing member of C shaped cross section that in use may receive a screw.

14. The connector assembly of claim 1, wherein at least one rib of the first plurality of ribs and at least one rib of the second plurality of ribs extend perpendicular from the longitudinal length of the projection and have a length that substantially matches the orthogonal length.

15. A frame assembly, comprising:
a support member, at least one hollow frame member and a connector configured to connect the at least one hollow frame member to the support member, wherein the connector includes a collar configured to engage an outer surface of the support member, the collar having a first opening at a first end and a second opening at a second end, the first opening and the second opening each defined by a same distance between a first inner surface of the collar and a second inner surface of the collar;
at least one elongated projection extending outward from the collar, the at least one projection having a first side wall having a first plurality of ribs and a second side wall having a second plurality of ribs, the first side wall and the second side wall resistant to deformation and connected by an end wall configured to resist lateral movement of the first wall and the second wall and each having an orthogonal length perpendicular to a longitudinal length of the projection, the orthogonal length being greater than a length of corresponding length of a first interior surface and a second interior surface of the hollow frame member such that when force is applied to fit the deformable open end over the projection in a direction along the longitudinal length of the projection, the interior surfaces of the hollow frame stretch to the orthogonal length of the projection and the first and second plurality of ribs positively engage the interior surfaces of the hollow frame member.

* * * * *

UNITED STATES PATENT AND TRADEMARK OFFICE
CERTIFICATE OF CORRECTION

| | | |
|---|---|---|
| PATENT NO. | : 7,883,288 B2 | |
| APPLICATION NO. | : 11/864064 | |
| DATED | : February 8, 2011 | |
| INVENTOR(S) | : Joannes Hendricus Maria Jorna | |

It is certified that error appears in the above-identified patent and that said Letters Patent is hereby corrected as shown below:

In the Claim Section, from column 4, line 56 to column 5, line 13, please replace claim 1 with the following:

1. A connector assembly, comprising:
 a hollow frame member having a deformable open end;
 an elongated projection having a first side wall and a second side wall resistant to deformation connected by an end wall configured to resist lateral movement of the first wall and the second wall;
 an outer surface of the first side wall of the projection having a first plurality of ribs;
 an outer surface of the second side wall of the projection having a second plurality of ribs;
 the outer surface of the first side wall and the outer surface of the second side wall each having an orthogonal length perpendicular to a longitudinal length of the projection, the orthogonal length being greater than a length of a first internal surface and a second internal surface of the hollow frame member such that when force is applied to fit the deformable open end over the projection in a direction along a longitudinal axis of the elongated projection, the first and second internal surfaces of the hollow frame member stretch to the orthogonal length of the projection and the first and the second plurality of ribs positively engage the first and second internal surfaces of the hollow frame member, respectively.

In the Claim Section, at column 5, lines 23 - 24, please replace claim 5 with the following:

5. The connector assembly of claim 1, wherein the projection has a rectangular cross section.

In the Claim Section, at column 5, lines 25 - 26, please replace claim 6 with the following:

6. The connector assembly of claim 5, wherein the projection is hollow and has an end closed by the end wall.

Signed and Sealed this
Seventh Day of June, 2011

David J. Kappos
*Director of the United States Patent and Trademark Office*

CERTIFICATE OF CORRECTION (continued)
U.S. Pat. No. 7,883,288 B2

In the Claim Section, at column 6, lines 16 - 43, please replace claim 15 with the following:

15. A frame assembly, comprising:
    a support member, at least one hollow frame member and a connector configured to connect the at least one hollow frame member to the support member, wherein the connector includes a collar configured to engage an outer surface of the support member, the collar having a first opening at a first end and a second opening at a second end, the first opening and the second opening each defined by a same distance between a first inner surface of the collar and a second inner surface of the collar;
    at least one elongated projection extending outward from the collar, the at least one projection having a first side wall having a first plurality of ribs and a second side wall having a second plurality of ribs, the first side wall and the second side wall resistant to deformation and connected by an end wall configured to resist lateral movement of the first wall and the second wall and each having an orthogonal length perpendicular to a longitudinal length of the projection, the orthogonal length being greater than a corresponding length of a first interior surface and a second interior surface of the hollow frame member such that when force is applied to fit the deformable open end over the projection in a direction along the longitudinal length of the projection, the interior surfaces of the hollow frame stretch to the orthogonal length of the projection and the first and second plurality of ribs positively engage the interior surfaces of the hollow frame member.